United States Patent
Tsai

(10) Patent No.: US 7,418,277 B2
(45) Date of Patent: Aug. 26, 2008

(54) HANDS-FREE APPARATUS WORKING WITH BLUETOOTH EARPHONE

(75) Inventor: Liang-Tan Tsai, Taipei (TW)

(73) Assignee: Global Target Enterprise Inc., Taipei (TW)

( * ) Notice: Subject to any disclaimer, the term of this patent is extended or adjusted under 35 U.S.C. 154(b) by 466 days.

(21) Appl. No.: 11/102,784

(22) Filed: Apr. 11, 2005

(65) Prior Publication Data

US 2006/0229110 A1    Oct. 12, 2006

(51) Int. Cl.
*H04B 7/00* (2006.01)
(52) U.S. Cl. .................. 455/569.2; 455/41.3; 455/66.1
(58) Field of Classification Search ............... 455/41.2, 455/41.3, 66.1, 550.1, 569.1, 569.2, 575.1
See application file for complete search history.

(56) References Cited

U.S. PATENT DOCUMENTS

2006/0046656 A1*   3/2006   Yang .......................... 455/41.3
2007/0197263 A1*   8/2007   Gudmand-Hoyer ...... 455/569.1

* cited by examiner

*Primary Examiner*—Thanh C Le

(57) ABSTRACT

A hands-free apparatus working with Bluetooth earphone includes a Bluetooth earphone, a transmission element, and a car audio. Wherein the bluetooth earphone includes a connector plug for a first connector of a transmission element to connect with, and a second connector of the transmission element is able to lodge in a connector socket of a front panel of the car audio. By the above-mentioned connection, the voice signal of the Bluetooth earphone is able to be transmitted to the car audio via the transmission element, then the car speaker can broadcast the voice signal, or the car audio can charge the Bluetooth earphone via the transmission element, then to achieve hands-free objects.

6 Claims, 6 Drawing Sheets

HANDS-FREE APPARATUS WORKING WITH BLUETOOTH EARPHONE

BACKGROUND OF THE INVENTION

1. Field of the Invention

The invention is about a hands-free apparatus working with Bluetooth earphone, and more particularly to a hands-free apparatus with car audio and Bluetooth earphone.

2. Description of the Prior Art

Conventional Bluetooth hands-free apparatus comprises a Bluetooth cellular phone and a car audio with Bluetooth chip module (i.e., Bluetooth car audio) to achieve hands-free communication when a user uses cellular phone and drives at the same time. The above-mentioned method is disadvantage in following situations:

1. Generally the user of Bluetooth cellular phone is used to apply Bluetooth earphone. Before using the Bluetooth earphone, the user has to operate a matching process to enable the Bluetooth earphone. When the user gets in a car, he has to turns off the Bluetooth earphone, wait for seconds, and then turn on the Bluetooth car audio and wait for seconds till the Bluetooth cellular phone establishes communication with the Bluetooth car audio. When the user gets off the car, he has to do an adversely operation. This process is too complex and disadvantage.

2. The combined hands-free apparatus of Bluetooth cellular phone and car audio needs car speaks as a loudspeaker when receiving an incoming call, which breaks communication privacy of the user when there is other passenger in the car.

3. The Bluetooth car audio has to equip the Bluetooth chip module. But not every car equipped the Bluetooth chip module, due to its expensive price. The user has to change the car audio or extra install a Bluetooth chip module to be compatible with Bluetooth cellular phone, which increases cost.

4. The combined hands-free apparatus of Bluetooth cellular phone and car audio can only take few of car speakers as the loudspeaker, and the sound effects of the speaker are not good, which decreases using intention of the user.

Thus it can be seen that the prior method still has disadvantages, and needs to be improved.

A hands-free apparatus working with Bluetooth earphone is desired, and the present invention is designed to meet the need of above.

SUMMARY OF THE INVENTION

The present invention is to provide a hands-free apparatus working with Bluetooth earphone, which directly inputs the voice signal of the Bluetooth earphone to the car audio via a transmission element. It can reduce complex operation and waiting time of prior art, and make the operation convenient to the user.

Another, the present invention is to provide a hands-free apparatus working with Bluetooth earphone, wherein the connector of the car audio, transmission element, and the connector can be USB, IEEE1394 fire wire, Phone jack, AMP-Molex, and etc, and transmits voice signal and power signal via the connector with transmission element.

Further, the present invention is to provide a hands-free apparatus working with Bluetooth earphone, wherein the voice signal of Bluetooth earphone inputted to the car audio can be broadcasted via all speakers, which has better sound effects than prior art More, when incoming call is private, the user can take off the earphone from the connection then chat via the earphone to ensure the privacy.

Still further, the present invention is to provide a hands-free apparatus working with Bluetooth earphone, which is low-cost, easy to operate, carry, and set up, compatible with other appliances, and long-using-life.

The hands-free apparatus working with Bluetooth earphone of the present invention comprises a Bluetooth earphone, a transmission element, and a car audio. The Bluetooth earphone comprises a connector plug for the connection with a first connector of the transmission element, and a second connector of the transmission connects to a connector plug of a front panel of the car audio. By the connection, it is able to input the voice signal of the Bluetooth earphone to the car audio, and then broadcast via the speakers, and it is able to charge the Bluetooth earphone by the car audio, then to achieve hands-free objects.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
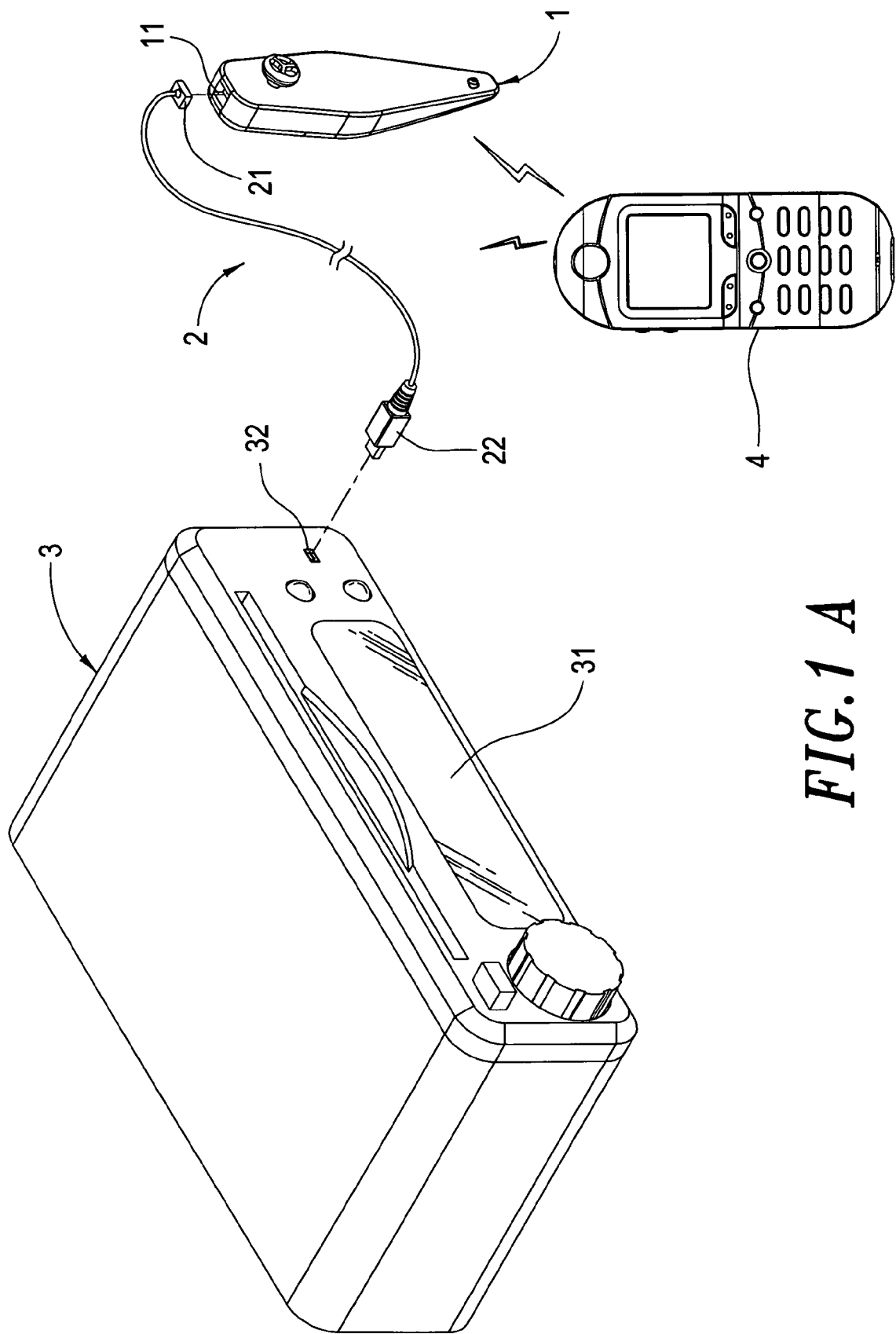
FIGS. 1A and 1B are perspective views of applicable structure of the invention.
FIG. 1C is a perspective view of one embodiment of the invention.
Figure 1B:
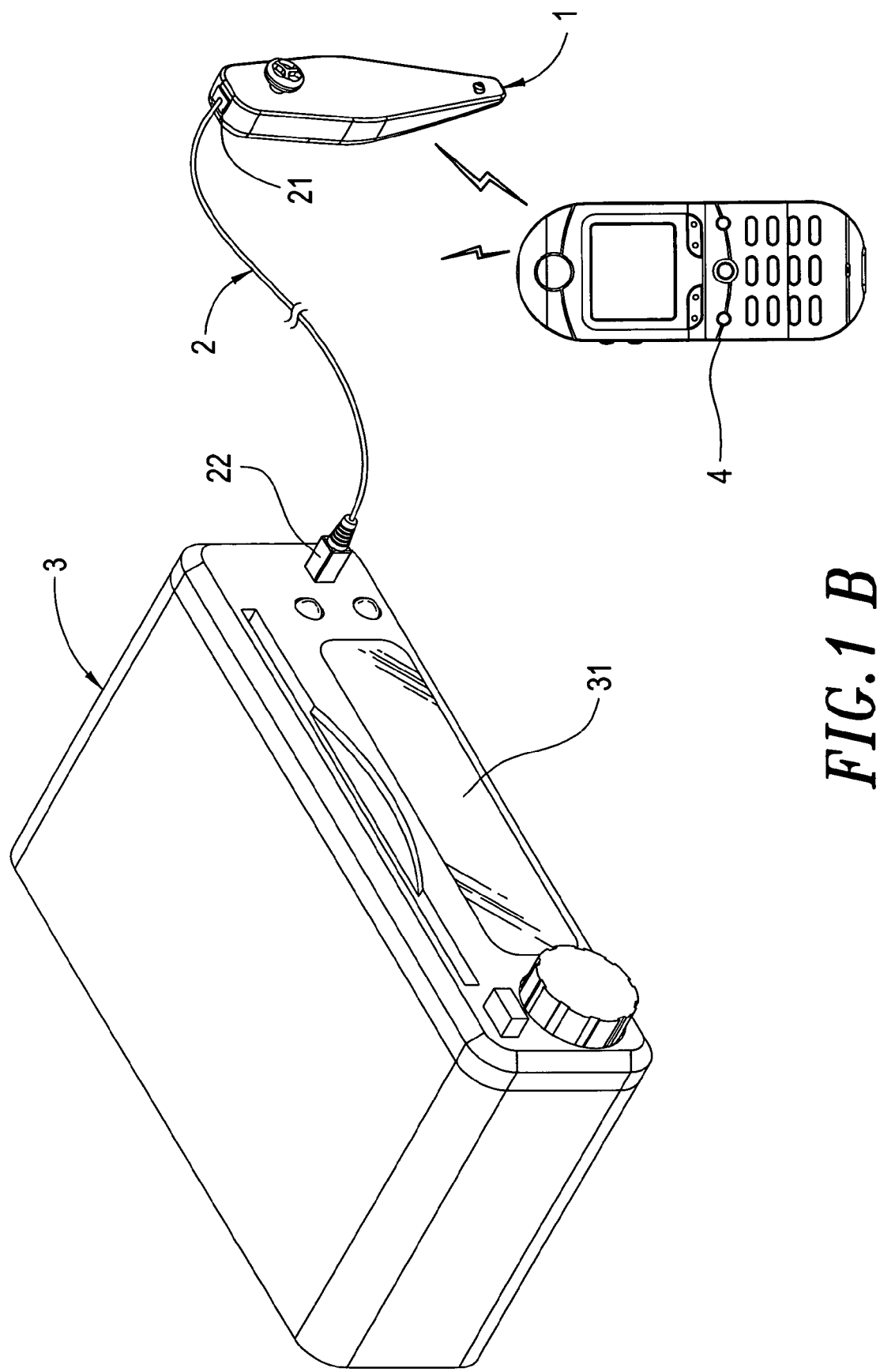

Referring to FIGS. 1A and 1B, as perspective views of applicable structure of the invention of a hands-free apparatus working with Bluetooth earphone includes a Bluetooth earphone 1, a transmission element 2, and a car audio 3.

The Bluetooth earphone 1 is able to dual communicate with a Bluetooth cellular phone 4, and comprises a connector socket 11 for a first connector 21 of a transmission line 2 to connect with.

The transmission line 2 has two terminals of the first connector 21 and a second connector 22. The first connector 21 is able to lodge in the connector socket 11, and the second connector 22 is able to lodge in a connector socket 32 of a front panel 31 of a car audio 3. The transmission line 2 is able to transmit voice signal or transmit voice signal and power signal at the same time.

The car audio 3 comprises the front panel 31 with the connector socket 32. The connector socket 32 is able to connect with the second connector 22.

By the above-mentioned connection, the voice signal of the Bluetooth earphone 1 is able to be transmitted to the car audio 3 via the transmission line 2, then the car speaker can broadcast the voice signal, or the car audio 3 can charge the Bluetooth earphone 1 via the transmission line 2, then to achieve hands-free objects.

Figure 1C:
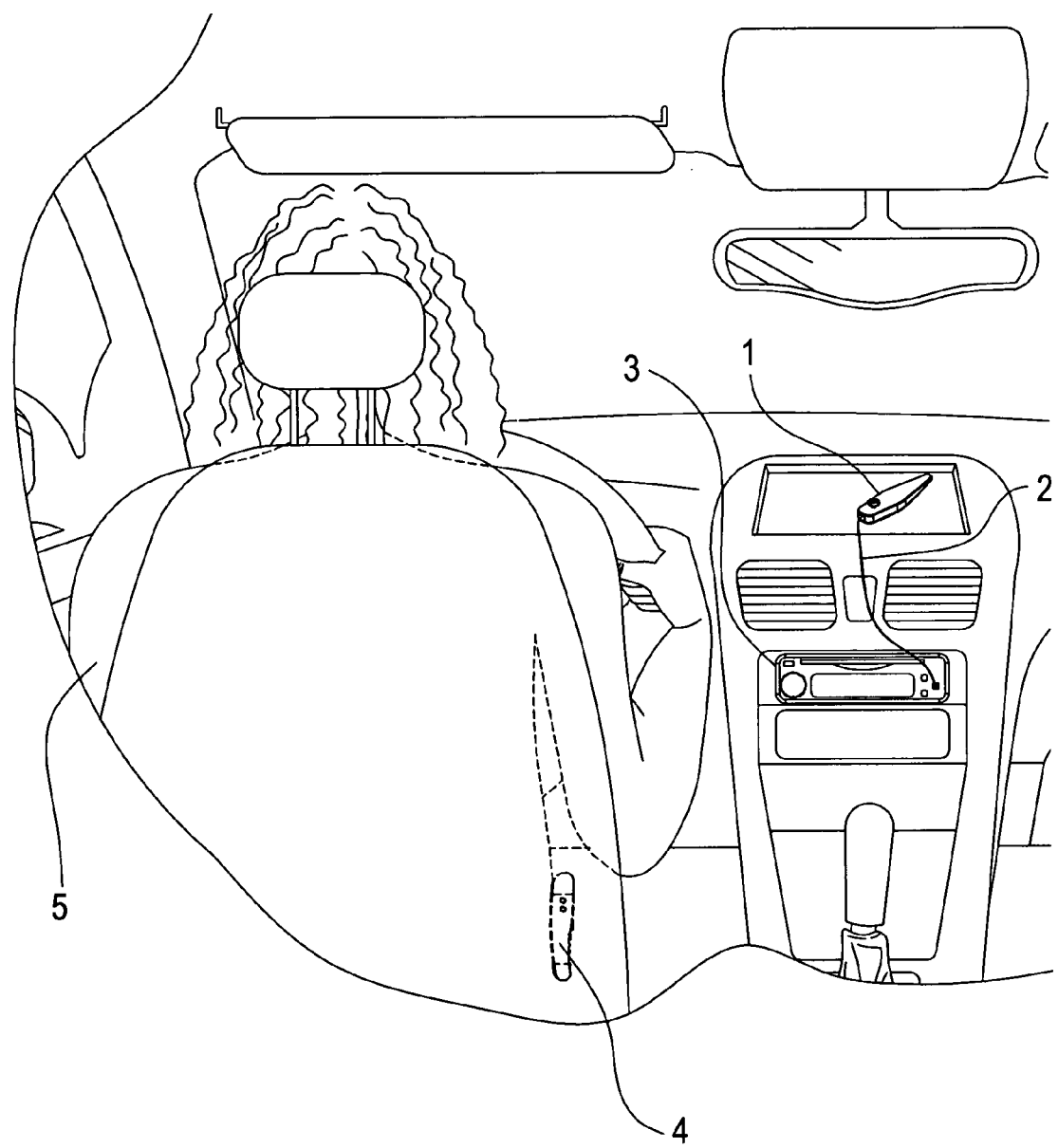

Referring to FIG. 1C, as a perspective view of one embodiment of the invention. When a user 5 gets in the car, he only needs to connect the Bluetooth earphone 1 with the car audio 3 via the transmission line 2 to establish a hands-free apparatus without any additional operation. The user 5 speaks to the microphone of the Bluetooth earphone 1, and the Bluetooth cellular phone 4 transmits the voice signal. Meanwhile the Bluetooth cellular phone 4 receives the voice signal and transmits it to the Bluetooth earphone 1, then the voice signal is transmitted to the car audio 3 via the transmission line 2 and broadcasted by the car speaker.

Figure 2A:
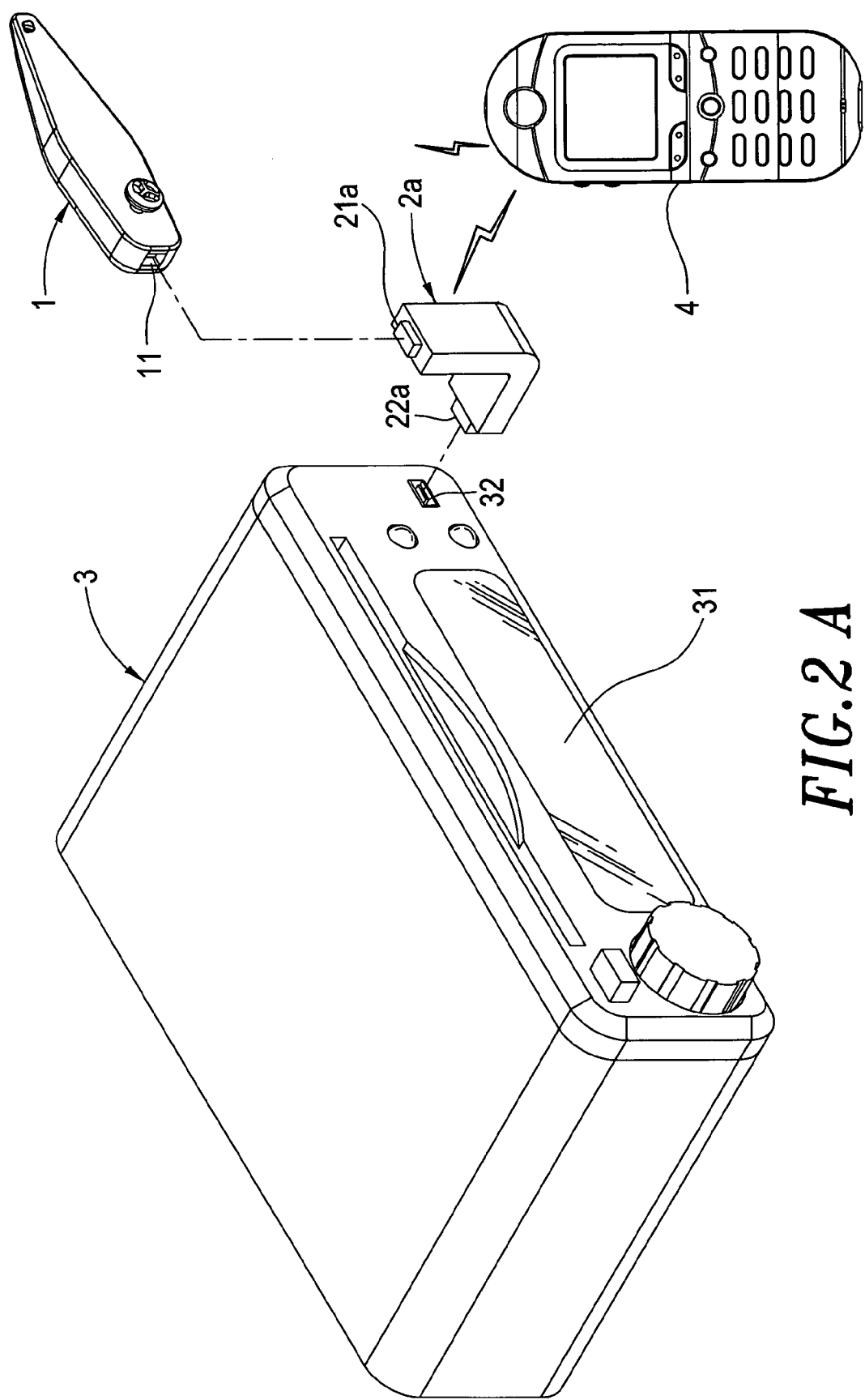
FIGS. 2A and 2B are perspective views of another applicable structure of the invention.
Figure 2:
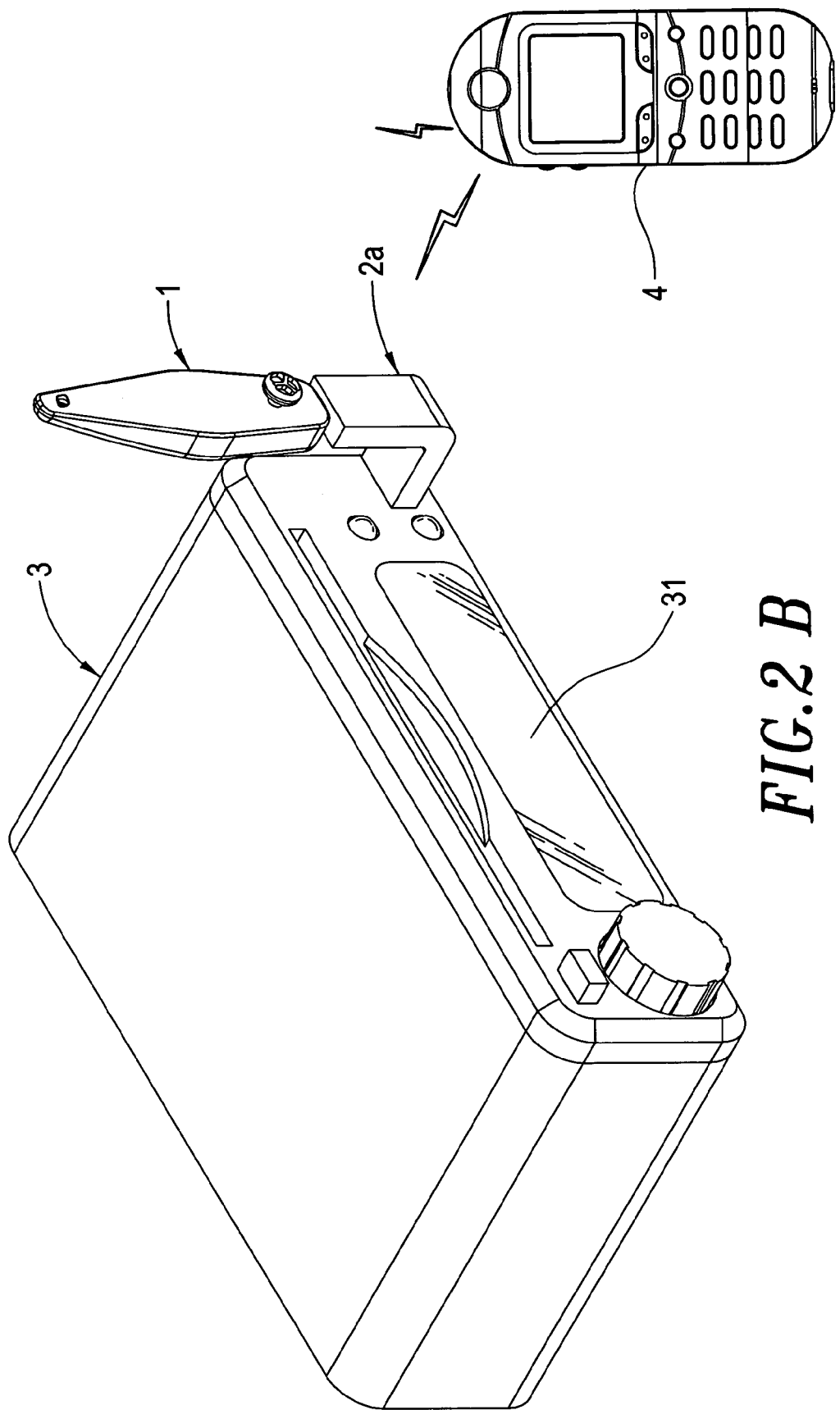
FIG. 2C is a perspective view of another embodiment of the invention.
Figure 2:
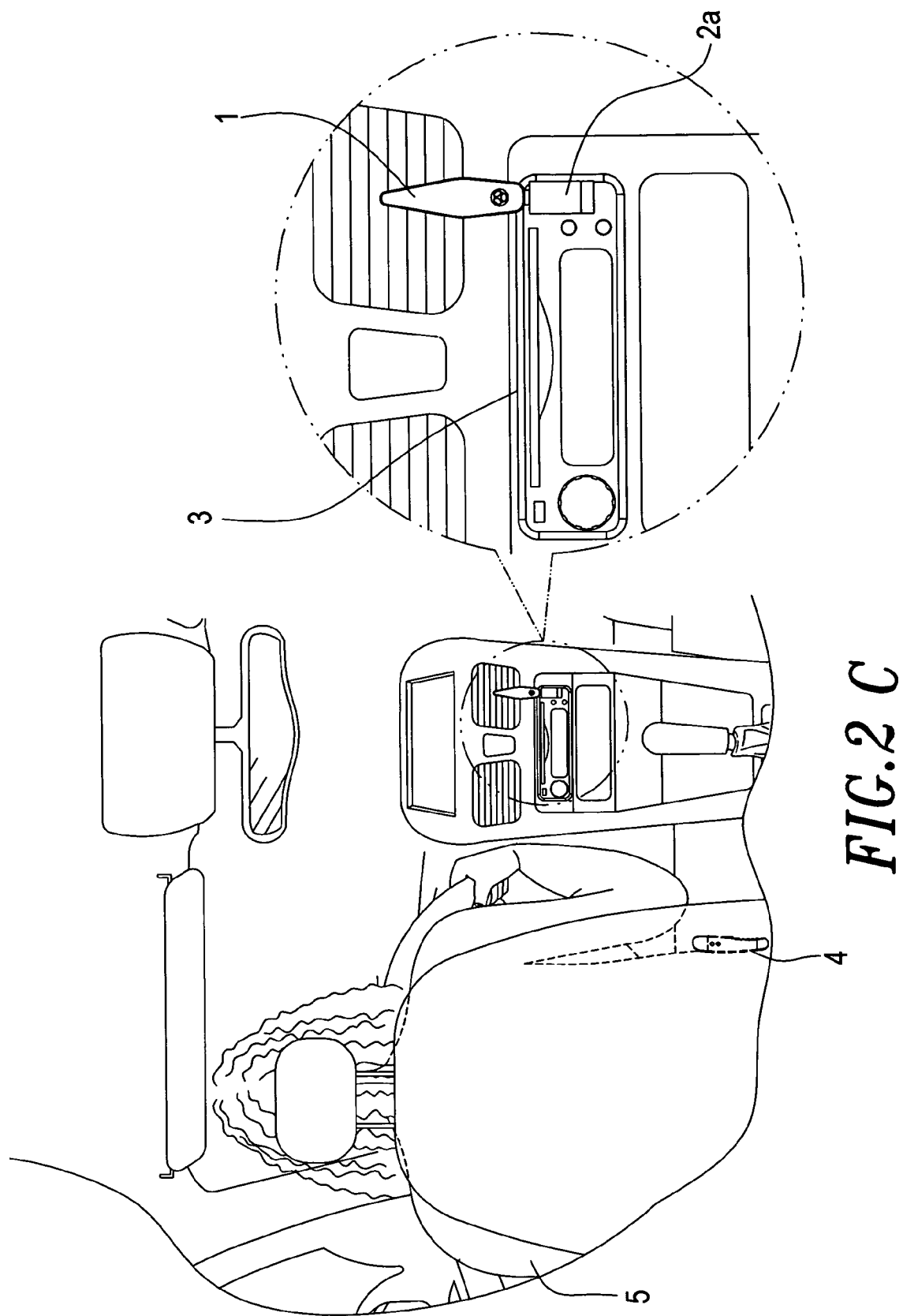

Referring to FIGS. 2A and 2B, as perspective views of another applicable structure of the invention of a hands-free apparatus working with Bluetooth earphone includes a Bluetooth earphone 1, a transmission element 2a, and a car audio 3.

The Bluetooth earphone 1 is able to dual communicate with a Bluetooth cellular phone 4, and comprises a connector socket 11 for a first connector 21a of a transmission line component 2a to connect with.

The transmission component 2a is a L-shape element (also can be a I-shape element), and the two terminals of the transmission component 2a are a first connector 21a and a second connector 22a, wherein the first connector 21a is able to lodge in the connector socket11 of the Bluetooth earphone 1, and the second connector 22a is able to lodge in the connector socket 32 of the front panel 31 of the car audio 3. The transmission component 2a is able to transmit voice signal or transmit voice signal and power signal at the same time;

The car audio 3 comprises the front panel 31 with the connector socket 32, and the connector socket 32 is able to connect with the second connector 22a of the transmission component 2a.

By the above-mentioned connection, the voice signal of the Bluetooth earphone 1 is able to be transmitted to the car audio 3 via the transmission component 2a, then the car speaker can broadcast the voice signal, or the car audio 3 can charge the Bluetooth earphone 1 via the transmission component 2a, then to achieve hands-free objects.

Referring to FIG. 2C, as a perspective view of another embodiment of the invention. When a user 5 gets in the car, he only needs to connect the Bluetooth earphone 1 with the car audio 3 via the transmission component 2a to establish a hands-free apparatus without any additional operation. The user 5 speaks to the microphone of the Bluetooth earphone 1, and the Bluetooth cellular phone 4 transmits the voice signal. Meanwhile the Bluetooth cellular phone 4 receives the voice signal and transmits it to the Bluetooth earphone 1, then the voice signal is transmitted to the car audio 3 via the transmission component 2a and broadcasted by the car speaker.

The connector can be USB, IEEE1394 fire wire, Phone jack, AMP-Molex, and etc.

The hands-free apparatus of the invention is advantaged in:

1. The invention is able to directly transmit the voice signal of the Bluetooth earphone to the car audio via the transmission element, which can reduce complex operation and save waiting time to achieve convenient use.

2. The connector of the car audio, transmission element, and Bluetooth earphone of the invention can be USB, IEEE1394 fire wire, Phone jack, AMP-Molex, and etc, and operate with the transmission element to transmit the voice signal and power signal.

3. The voice signal inputted to the car audio from the Bluetooth earphone is able to be broadcasted by all car speakers to perform better sound effects. When private chatting, the user can take off the earphone from the transmission element to keep privacy.

4. The invention is able to achieve hands-free and charge the Bluetooth earphone.

5. The invention is low-cost, easy to operate, carry, and set up, compatible with other appliances, and long-using-life.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A hands-free apparatus, comprising:
   a Bluetooth earphone, which is able to dual communicate with a Bluetooth cellular phone, and comprises a connector socket for a first connector of a transmission element to connect with;
   the transmission element with two terminals of a first connector and a second connector, wherein the first connector is able to lodge in the connector socket of earphone, and the second connector is able to lodge in a connector socket of a car audio;
   the car audio, which comprises the connector socket, and the connector socket is able to connect with the second connector; and
   by the above-mentioned connection, the voice signal of the Bluetooth earphone is able to be transmitted to the car audio via the transmission element, then the car speaker can broadcast the voice signal, or the car audio can charge the Bluetooth earphone via the transmission element, then to achieve hands-free objects
   wherein the transmission element is able to transmit voice signal and power signal at the same time.

2. The hands-free apparatus of claim 1, wherein the transmission element can be a transmission line.

3. The hands-free apparatus of claim 1, wherein the transmission element can be a transmission component.

4. The hands-free apparatus of claim 1, wherein the connector can be USB, IEEE1394 fire wire, Phone jack, and AMP-Molex.

5. The hands-free apparatus of claim 3, wherein the transmission component can be a L-shape component.

6. The hands-free apparatus of claim 3, wherein the transmission component can be a I-shape component.

* * * * *